Aug. 24, 1948. J. B. CRAWLEY 2,447,492
TIMING MODULATION
Filed April 15, 1944
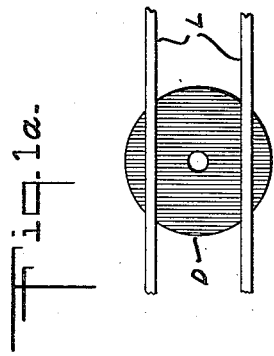
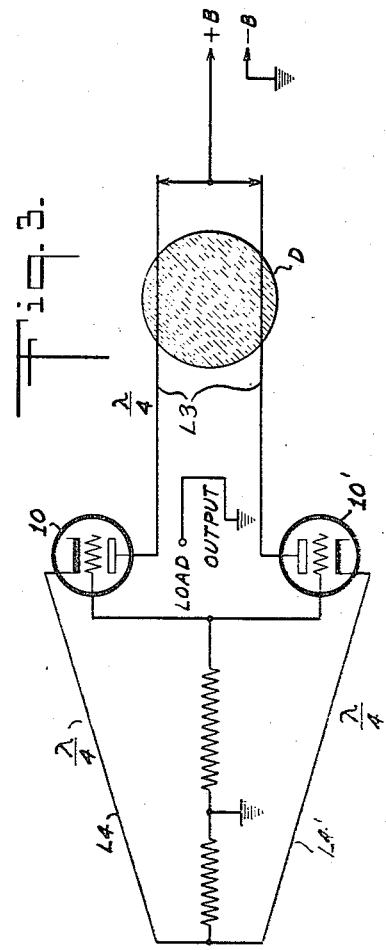
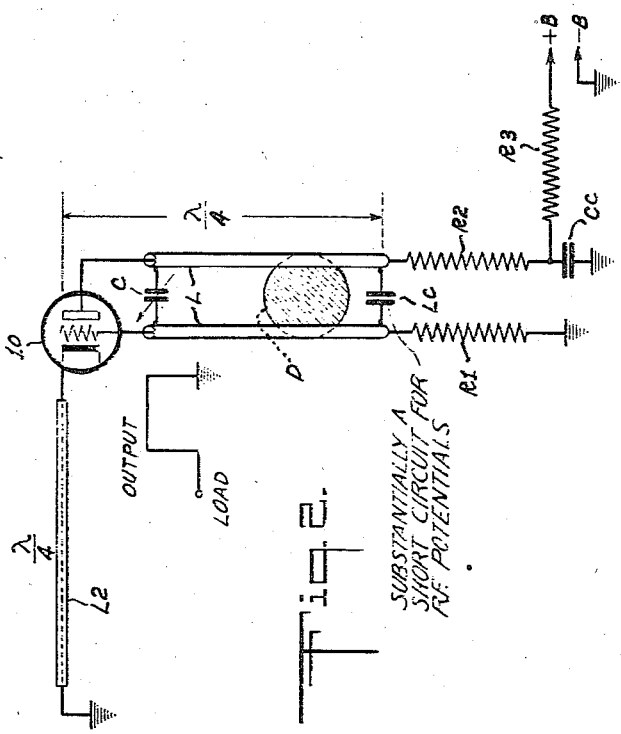
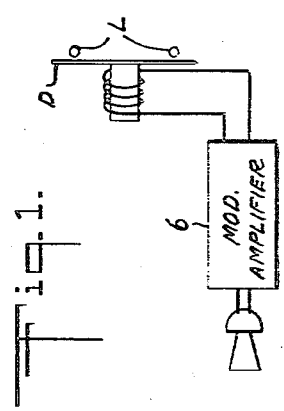
INVENTOR.
JAMES B. CRAWLEY
BY
*H. G. Grover*
ATTORNEY.

Patented Aug. 24, 1948

2,447,492

UNITED STATES PATENT OFFICE 2,447,492

TIMING MODULATION

James Bruce Crawley, Washington, D. C., assignor to Radio Corporation of America, a corporation of Delaware Application April 15, 1944, Serial No. 531,269

6 Claims. (Cl. 179—171.5)

This application relates to improved methods of and means for modulating the timing or angular velocity of oscillatory energy. The improved method and means of this application are particularly applicable to modulation of oscillatory energy of very high frequency.

Difficulty is encountered in constructing modulators known today for operation at very high frequency. For instance, it is difficult to arrange and construct reactance tube modulators which will operate at very high frequency.

A general object of this invention is to provide an economical, simple method of and means for modulating the timing or angular velocity of oscillatory energy of very high frequency.

Moreover, in certain other types of modulators which will operate at higher frequency the timing modulation is not linear with respect to the modulation current. For example, the presently known capacity type modulators do not give a linear change of capacity nor do they give a linear change of capacity for linear input change of voltage to the voice coil of the modulator unit.

An additional object of my invention is an improved yet simple method and means for linearly modulating the timing of oscillatory energy of very high frequency in accordance with control or modulation currents or potentials.

The manner in which the above objects and other objects which will appear hereinafter are attained will now be described. In this description reference will be made to the attached drawings wherein Figs. 1 and 1a are basic diagrams illustrating an improved modulator arranged in accordance with my invention.

Figs. 2 and 3 illustrate somewhat more completely the essential features of very high frequency tube and line generators with my improved modulator.

In my modulation system, a conductive element such as a metallic diaphragm D of Fig. 1 is used as the modulating means. This diaphragm is attached to a voice coil unit which is in turn connected to the output of a modulation amplifier 6. The diaphragm is arranged close to the lines L in an oscillation frequency determining circuit. The lines L may be tuned and may comprise the frequency determining circuit of an oscillation generator or an oscillation amplifier. Movement of the diaphragm D relative to the line under control of the modulation tunes the line to thereby modulate the timing of the oscillations therein.

The modulating device is similar to a dynamic speaker unit in that the field pot, voice coil, etc., are of the same general design. However, instead of the usual paper cone a metallic diaphragm D is mechanically connected to the voice coil unit.

In a specific embodiment, the line sections L that form the resonant circuit for the oscillator are mounted on the field pot of the modulator. These lines are physically close to the diaphragm D but not close enough so that the diaphragm will short them during movement under modulation control.

Movable metal diaphragms associated with the end of lines have been used for modulation purposes heretofore. In these arrangements the capacity across the end of the lines is varied by movement of the diaphragm. This capacity change will frequency modulate the output of the tube generator. In these schemes the capacity at the end of the line is increased when the diaphragm approaches the line and the timing of the oscillatory energy decreases. Movement of the diaphragm away from the line reduces the line end capacity and increases the frequency of the oscillations.

In my improved system the diaphragm is mounted intermediate the ends of the line as illustrated in Fig. 1a. As a consequence, the modulator diaphragm is close to a greater part of the entire length of the tuned line section. In this way movement of the diaphragm varies the capacity along the lines entire length not just across the ends of the line.

The effect is that as the diaphragm D approaches the lines apparently increasing the capacity between the sections, the frequency of the system being controlled increases rather than decreases as might be expected. An apparent reason for this is that the diaphragm D now acts as a brass slug acts when placed inside a coil.

The lines L may be in the frequency determining circuit of radio apparatus such as generators and amplifiers to modulate the tuning of the line and the timing of the oscillatory energy. For purposes of illustration, I have shown in Figs. 2 and 3, known high frequency generators arranged to be modulated in accordance with my invention.

In Fig. 2, the lines L have an electrical length substantially equal to λ/4. This length includes the electrodes of the tube 10 which may, for example, be of the type known as 955.

In these systems substantially all connections are made as short as possible. The ends of the lines at the grid and anode are coupled by a small tuning condenser C with the connections as direct as possible. The other ends of the line are connected to ground by resistances R1 and R2. The connections between the anode and ground is through a coupling condenser CC. This electrode is also coupled by a resistance R3 to a source of high potential. The ends of the lines remote from the tube electrodes are coupled by a relatively large condenser LC and may be considered at ground or near ground radio frequency potential. The cathode is connected to ground by a line L2 of a length of approximately λ/4. As is well known in the art, the tube and connections described comprise the essential elements of an oscillator of the Hartley type.

The modulator diaphragm D is mounted adjacent the lines as shown somewhat nearer to the closed end than to the open end.

The arrangement of Fig. 3 is similar in many respects to the arrangement of Fig. 2. In Fig. 3, a pushpull oscillator is shown and the operation thereof is apparent from the drawings and the description given above. It may be noted, however, that the connection between the grids of the two tubes 10 and 10' is as short as possible. The lines L3 between the anodes and the plate source are electrically equal to λ/4. Here again the tube electrodes are considered in dimensioning the line. The cathode connections are also of a length substantially equal to λ/4 and these two leads L4 and L4' may be considered substantially closed and grounded at the ends remote from the cathodes. The tubes 10 and 10' may also be of the 955 type.

The output or load in both embodiments should be taken from a loop inductively coupled to the plate lines, L in Fig. 2 and L2 in Fig. 3. This is not critical, however, since at ultra-high-frequency the interelectrode capacity is practically zero impedance, so that the amount of radio frequency presented at the grid approximates that at the plate. Therefore, the load could have been taken by coupling to the grid circuit without too much loss of power.

The peculiar manner in which modulation takes place, that is, apparent increase in capacity causing an increase in frequency and vice versa, may be explained in various manners.

It is my opinion that since the lines, say L of Fig. 2, are not directly shorted at the far end but are tied together by a fairly large condenser, the impedance between the far end of the lines is not zero. The modulation diaphragm D is located nearer the partially shorted end of the lines L than it is to the open end. Therefore, when the disc is brought nearer the lines it places a capacity in shunt with the lines that approaches that of the condenser which effectively shorts the ends of the lines. This has the effect of moving the shorting condenser nearer the open end of the lines. The effect then is as follows: even though the capacity increases as the disc approaches the lines, because the disc is nearer the shorted end of the lines than the open ends, it has the effect of physically shortening the line length, thereby causing an increase in frequency with an increase in capacity.

An advantage of my improved system is that it is a simple, economical method of and means for frequency modulating of very high frequency. Moreover, it is believed that this method of frequency modulation will give a sinusoidal change of oscillator frequency for a sinusoidal input voltage to the modulator. That is to say, it is believed the frequency of the oscillator will change linearly for a linear movement of the modulator diaphragm.

I claim:

1. In electrical apparatus, a high frequency circuit arrangement including parallel lines the electrical length of which determines in part the tuning of the circuit and the frequency of operation thereof, means for substantially short-circuiting said lines at one end thereof, a metallic element located adjacent said lines intermediate the ends thereof, said metallic element comprising a surface parallel to said lines the dimension of which surface along the length of the lines is an appreciable fraction of the lines length so that said metallic element is electrically coupled to a substantial part of the length of the lines, and means for controlling the position of the metallic element with respect to the lines in accordance with control potentials, the arrangement being such that movement of the member toward the lines increases the frequency to which the circuit is tuned and movement of the member away from the lines decreases the frequency to which the circuit is tuned.

2. In a signalling system, a high frequency circuit arrangement including an electron discharge device the frequency of operation of which is controlled by parallel lines, said parallel lines being substantially directly coupled together at one end whereby said lines at said one end are effectively at substantially ground potential with respect to high frequency voltages, a metallic element located adjacent said lines intermediate the ends thereof, said metallic element having a surface the dimension of which along the length of said lines is an appreciable fraction of the lines length so that the said metallic element is electrically coupled to a substantial part of the length of the line, and means for controlling the position of the metallic element with respect to the lines in accordance with signals to correspondingly control the tuning of the lines and the frequency of operation.

3. In a signalling system, a high frequency circuit arrangement including an electron discharge device having electrodes in a high frequency circuit including parallel lines, said parallel lines being substantially directly coupled together at one end whereby said lines at said one end are effectively at substantially ground potential with respect to high frequency voltages, a metallic element located adjacent said lines intermediate the ends thereof, said metallic element comprising a surface parallel to said lines the dimension of which surface along the length of the lines is an appreciable fraction of the lines length so that said metallic element is electrically coupled to a substantial part of the length of the lines, and means for controlling the position of the metallic element with respect to the lines in accordance with signals to correspondingly control the tuning of the lines, the arrangement being such that movement of the member toward the lines increases the frequency to which the circuit is tuned and movement of the member away from the lines decreases the frequency to which the circuit is tuned.

4. In a modulation system, an oscillation generator including a tube having electrodes coupled in an oscillation generating circuit including parallel lines the electrical length of which lines determines in part the frequency of operation of the generator, a metallic element located adjacent said lines intermediate the ends thereof, said metallic element comprising a surface parallel to said lines the dimension of which surface along the length of the lines is an appreciable fraction of a wave length so that said metallic element is electrically coupled to a substantial part of the length of the lines, and means for controlling the position of the metallic element with respect to the lines in accordance with signals, the arrangement being such that movement of the member toward the lines increases the frequency to which the circuit is tuned and movement of the member away from the lines decreases the frequency to which the circuit is tuned.

5. In an ultra high frequency signalling system, a pair of electron discharge devices each having electrodes including a control grid, an anode and a cathode, a high frequency oscillation generating circuit coupled with said electrodes, said circuit including parallel lines the electrical length of which determines in part the tuning of the oscillation generating circuit, a coupling between adjacent ends of each of said lines and the anode of a different one of said devices, a substantial direct coupling between the other ends of said parallel lines, a metallic element located adjacent said lines intermediate the ends thereof and electrically coupled to a substantial part of the length of the lines, a source of modulating potentials and magnetic means excited by modulating potentials from said source for varying the position of said metallic element with respect to said lines in accordance with said modulating potentials, the arrangement being such that movement of the member toward the lines increases the frequency to which the oscillation generating circuit is tuned and movement of the member away from the lines decreases the frequency to which the oscillation generating circuit is tuned.

6. In an ultra high frequency signalling system, an electron discharge device having electrodes including an anode, a cathode and a control grid, a high frequency oscillation generating circuit coupled with the electrodes of said device, said high frequency oscillation generating circuit including parallel lines, a coupling between adjacent ends of the parallel lines and the control grid and anode of said device, a coupling of low impedance between the remaining ends of said parallel lines, a metallic element located adjacent said lines intermediate the ends thereof and electrically coupled to a substantial part of the length of the lines, a source of modulating potentials, and magnetic means excited by potentials from said modulation potential source for controlling the position of said metallic member with respect to said lines in accordance with the modulating potentials, the arrangement being such that movement of the member towards the lines increases the frequency to which the oscillation generating circuit is tuned and movement of the member away from the lines decreases the frequency to which the oscillation generating circuit is tuned.

JAMES BRUCE CRAWLEY.

REFERENCES CITED

The following references are of record in the file of this patent:

UNITED STATES PATENTS

| Number | Name | Date |
| --- | --- | --- |
| 2,060,778 | Finch | Nov. 10, 1936 |
| 2,095,980 | Hansell | Oct. 19, 1937 |
| 2,114,036 | Smith et al. | Apr. 12, 1938 |
| 2,160,466 | Usselman | May 30, 1939 |
| 2,175,710 | Usselman et al. | Oct. 10, 1939 |
| 2,219,922 | Gossel | Oct. 29, 1940 |
| 2,246,928 | Schick | June 24, 1941 |
| 2,261,879 | Higgins | Nov. 4, 1941 |
| 2,283,793 | Cork et al. | May 19, 1942 |
| 2,286,428 | Mehler | June 16, 1942 |
| 2,306,282 | Samuel | Dec. 22, 1942 |